June 4, 1929.  C. H. BRASELTON ET AL  1,715,638
FUEL FEED SYSTEM
Filed June 6, 1922
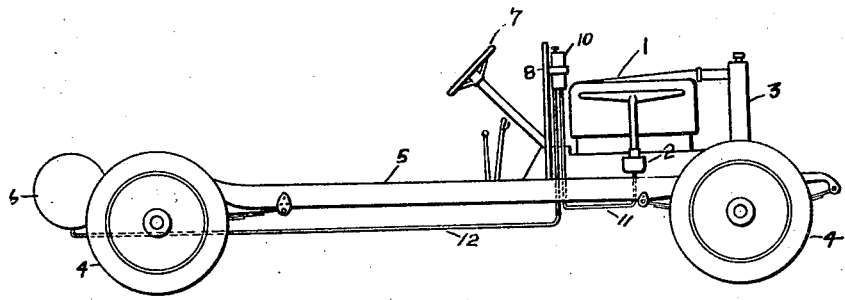
Fig. I.
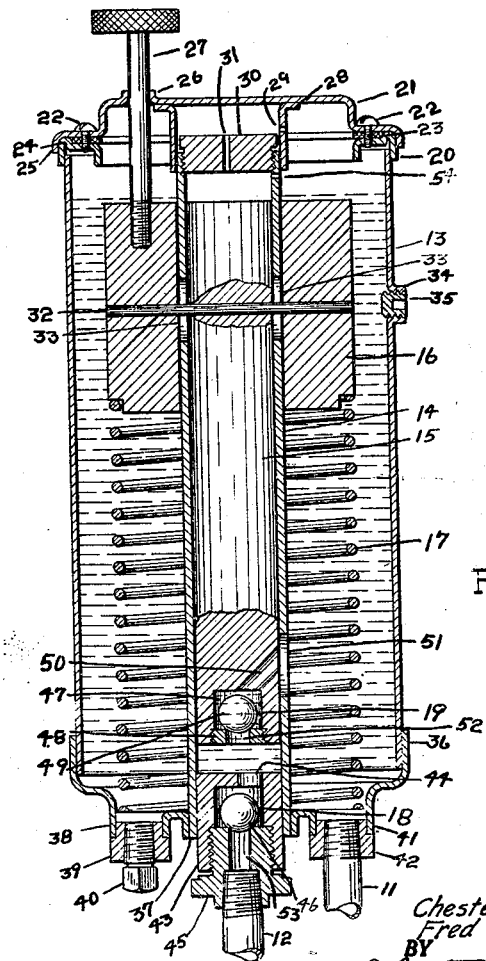
Fig. II.
INVENTORS
Chester H. Braselton
Fred B. MacLaren
BY
ATTORNEY Patented June 4, 1929.

1,715,638

UNITED STATES PATENT OFFICE.

CHESTER H. BRASELTON, OF NEW YORK, AND FRED B. MacLAREN, OF JAMAICA, NEW YORK; SAID MacLAREN ASSIGNOR TO SAID BRASELTON.

FUEL-FEED SYSTEM.

Application filed June 6, 1922. Serial No. 566,292.

REISSUED

This invention relates to improvements in fluid pumping apparatus in which the vibration of a moving vehicle is a source of power to operate the pump, and more particularly to means for supplying gasoline to the carburetor of an automobile engine at a level somewhat above that of the carburetor float when the main fuel tank is located below the level of the carburetor float.

The principal object of this invention is to increase the efficiency of the pump by eliminating friction and binding from the plunger action. A further object of the invention is to provide simple and effective controlling means operated by the height of liquid in the reserve tank. A still further object of the invention is the provision of means for supporting the heavy inertia element against horizontal forces. Other objects of the invention will appear from the description of the apparatus.

The invention consists in the several novel features set forth in the following description and more particularly defined by the claims at the conclusion thereof.

The invention is illustrated somewhat diagrammatically in the accompanying drawings, in which—Figure I is a diagrammatic view of an automobile equipped with our device; Figure II is a sectional elevation of the pump with its enclosing gasoline reservoir. In Figure I the numeral 1 designates the engine, 2 the carburetor, 3 the radiator, 4 the wheels, 5 the frame, 6 the tank, and 7 the steering wheel of an automobile. Our combined pump and auxiliary tank is designated by the numeral 10, and is shown mounted on the front side of the dash-board 8. The pipe 11 connects the tank 10 with the carburetor 2 and the pipe 12 connects the main fuel tank 6 with the auxiliary tank 10.

In Figure II the numeral 13 represents the body of the tank, 14 the pump cylinder, 15 the pump plunger, 16 the inertia weight, 17 the spring, 18 the suction valve, and 19 the discharge valve. The double flanged ring 20 is soldered to the top of the pump body 13 and to it is fastened the cover 21 by the screws 22, a tight joint being accomplished by the use of the cork gasket 23. A ridge 24 is formed in the ring 20 slightly less in height than the thickness of the gasket 23. This ridge is perfectly flat on its upper surface and forms a true seat for the cover 21 which cannot be pulled down unevenly by the screws 22. This construction allows a gasoline tight joint to be made by slightly compressing the cork gasket without the danger of seating the cover 21 out of alignment. The flange 25 is formed on the cover and fits over the outer flange on the ring 20 to aid in centering it.

A pierced boss 26 is formed in the top of cover 21 to act as a guide and bearing for the handle 27 which is screwed into the weight 16. The flanged ring 28 is soldered or otherwise fastened securely to the cover 21 and forms a guide or upper support for the pump cylinder 14. A small hole 29 is drilled in the ring 28 just above the point at which the pump cylinder 14 ends. A plug 30 is screwed into the pump cylinder 14 to form an upper cylinder head and it has a small hole 31 drilled through it to act as an air vent. Pin 32 connects the weight 16 and the plunger 15 and passes through the pump cylinder walls at the slots 33. A boss 34 is formed in the side of the tank body 13 for the purpose of facilitating the assembly of the pump plunger 15, weight 16 and pin 32. This pierced boss is closed after assembly by the plug 35. The spring 17 supports the weight 16 at its upper end and is supported by the bottom cover 36. This cover is soldered to the tank body 13 to make a gasoline tight joint and is provided with a cylindrical flange 37 to support and accurately position the pump cylinder 14. This bottom cover is provided with boss 38 in which is soldered a tapped plug 39. The tapped hole in the plug 39 is filled with the pipe plug 40 which is removable for the drainage of water and the flushing out of sediment. The cover is provided with another boss 41 in which is soldered the tapped plug 42 adapted to receive the carburetor feed pipe 11.

The valve retainer 43 is soldered in the bottom of the pump cylinder 14 and has the suction inlet hole 44 drilled out of alignment with valve seat. The valve seat 45 is threaded into the valve retainer 43 and supports the ball valve 46. This valve seat 45 is tapped at its lower end to receive the main fuel supply pipe 12. The pump plunger 15 has a valve chamber 47 formed in it at the bottom which is closed by the valve seat 48 upon which rests the delivery ball valve 49. The delivery passage 50 connects with the ball chamber 47 and the inside of tank body 13 by the slot 51. The ball 49 opens and closes passage through the hole 52 in the valve seat 48.

The ball valve 46 opens and closes passage through the hole 53 in the valve seat 45.

When the automobile moves over the ordinary road, the wheels 4 passing over small irregularities, such as bumps or hollows, tend to follow the exact contour of the road. This is especially true when the speed of the car is low and the ratio of the weight carried above the springs to that of the weight of axles and wheels, or weight carried below the springs, is large. That part of the car mass carried above the springs is set into vibration whenever the wheels 4 pass over rough spots in the road. The period of these vibrations depends mostly on the deflection of the springs.

In our pumping mechanism the pump plunger 15, with its attached weight 16 is mounted on the spring 17, so as to form a vibrating combination. If the bottom cover 36 is forcibly vibrating by any means it will tend to set in vibration, through the spring, the pump plunger 15. In this case it is desirable that the periodicity of the plunger, weight and spring should be much less than that of the forcibly applied vibration of the cover 36. For if the frequency of vibration of the plunger, weight and spring was higher than that of the forced vibration of the cover 36 there would be little relative movement between the plunger and the pump cylinder, while, on the contrary, if the frequency of vibration of the pump plunger, weight and spring is less than that of the forced vibrations of the cover 36, a large relative motion of the plunger 15 and the cylinder 14 will result. In practice, the frequency of the vibration of the pump body mounted on the front of the dash-board will vary between 150 and 250 vibrations per minute. The natural period of vibration of the moving elements of our pump should not be much higher than the above values for efficient operation.

When the car moves over the road and the wheels meet a small bump the springs are bent and a force is applied to the car body, causing it to rise slightly, carrying with it the tank body 13 and its attached bottom cover 36. The weight 16, being resiliently mounted on the spring 17, does not move with the bottom plate 36, but only tends to move by the additional pressure of the spring 17 when it has been compressed by the relative motion between the cover 36 and the weight 16. Because of the large weight of the element 16, its motion will lag behind that of the car, and the space between the valve retainer 43 and the plunger 15 will be diminished, causing the fluid which occupied this space to push the ball valve 49 off its seat and flow upward through the valve chamber 47, passage 50 and slot 51, to the interior of the tank body 13. When the wheels have passed over the obstruction, the body of the car, and with it the bottom cover 36, falls, and the weight 16 tends to remain fixed in space until the spring 17 has expanded to a length where it will no longer support the weight, and the difference between the spring supporting force and that of gravity tends to make the weight fall. It will be seen, however, that there is a lag in the dropping of the weight, as in the rising, and consequently, the space between the valve retainer 43 and the pump plunger 15 will be enlarged and a vacuum produced, which will be filled by the atmospheric pressure forcing the gasoline in the tank 6 through the pipe 12, raising the ball 46 off its seat and flowing into the pump through the passage 44. The above outlined action will be repeated for every bump or depression in the road, and sufficient gasoline will be pumped to keep the tank 13 always filled and a supply at higher level than the carburetor, is assured.

When the gasoline in the tank 13 reaches the level of the small hole 54, it flows through and fills the chamber formed between the top of the plunger 15 and the plug 30. Subsequent motion of the pump drives the air out through the small hole 31 and completely fills the chamber with gasoline. Then on every stroke of the pump, gasoline will be forced in and out of the holes 54 and 31, and as the resistance to the flow of gasoline through these holes is much greater than that of air the relative motion of the plunger 15 and the cylinder 14 will be dampened and substantially stopped until the level of gasoline in the tank 13 is lowered by the suction of the carburetor and air instead of gasoline is drawn in and out through the holes 54 and 31. Then the dampening is greatly reduced and full pumping is resumed. In practice the gasoline level in the tank will be such that air and gasoline will be drawn together through the hole 54, or the level will oscillate above and below that of the hole 54 so that dampening and freeing of the pump action will follow each other in rapid succession. Extraordinary demands for gasoline will be met by the reserve supply in the tank which will normally amount to a quart or more.

The handle 27 is supplied for use in partially filling the tank if for any reason it should become drained, as by running the engine idle without the car in motion, or if the supply of fuel has become exhausted.

The pump cylinder 14 is supported at the top by the flanged ring 28 attached to the cover 21. We find this support to be advantageous in reducing the tendency of the cylinder to bend when horizontal forces are applied to the weight 16. Such forces tend to act when the car rounds a curve quickly, or when bumps at one side only of the road are encountered; or on the two sides acting alternately and tending to cause a side sway of the car. Weight 16, because of its large inertia tends to remain fixed in space and resists this side motion and therefore tends to bend or displace the pump cylinder 14. The support 28, being applied close to the center gravity of the inertia element, effectively prevents distortion or side motion of the pump cylinder. It has been found that but very little friction is necessary to retard the action of the pump and reduce its efficiency, therefore, a long bearing of the plunger in the cylinder is used, as by this means, the fit of the plunger in the cylinder can be made quite loose, with subsequent reduction in friction and without danger of excessive leakage.

The invention is a modification of our copending applications entitled "Inertia pumps", Serial No. 532,718 and "Vibration operated pumps", Serial No. 532.719, both filed January 30, 1922, and "Vibration operated pumping mechanism", Serial No. 533,493, filed February 1, 1922.

What we claim is:

1. In a fuel feed system, the combination of a tank; a pump within said tank, said pump comprising a cylinder, and a plunger movable within the cylinder; and means secured within the cylinder for damping the movement of said plunger.

2. In a fuel feed system, the combination of a casing adapted to require a supply of liquid and having an inlet aperture; a pump positioned within said casing and in connection with said aperture; said pump comprising a cylinder, a plunger movable within the cylinder, an inlet valve adjacent said inlet aperture, and an outlet valve positioned within said plunger; a conduit from the outlet valve to the interior of the casing; a weighted cylinder attached to the plunger; resilient means tending to maintain yieldingly the plunger and weighted cylinder in a set position, and means positioned in said pump cylinder in the end opposite the inlet aperture for damping the movement of the plunger when the liquid has reached a predetermined level in the tank.

In testimony whereof, we affix our signatures.

CHESTER H. BRASELTON.
FRED B. MacLAREN.